(No Model.)
T. A. EDISON.
GOVERNOR FOR MOTORS.
No. 604,740.
2 Sheets—Sheet 1.
Patented May 31, 1898.
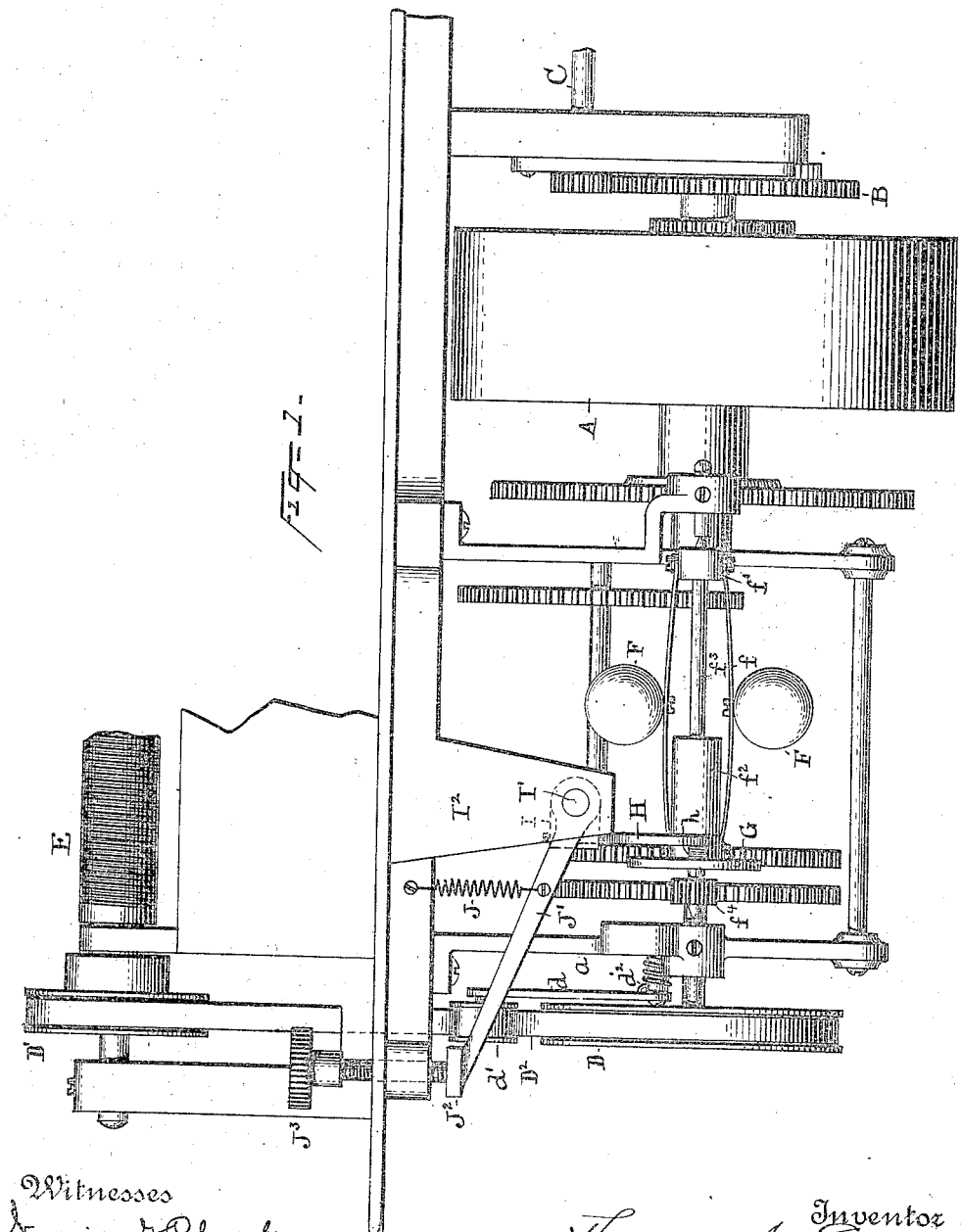
Witnesses
Inventor
Thomas A. Edison
By his Attorneys
Dyer & Driscoll

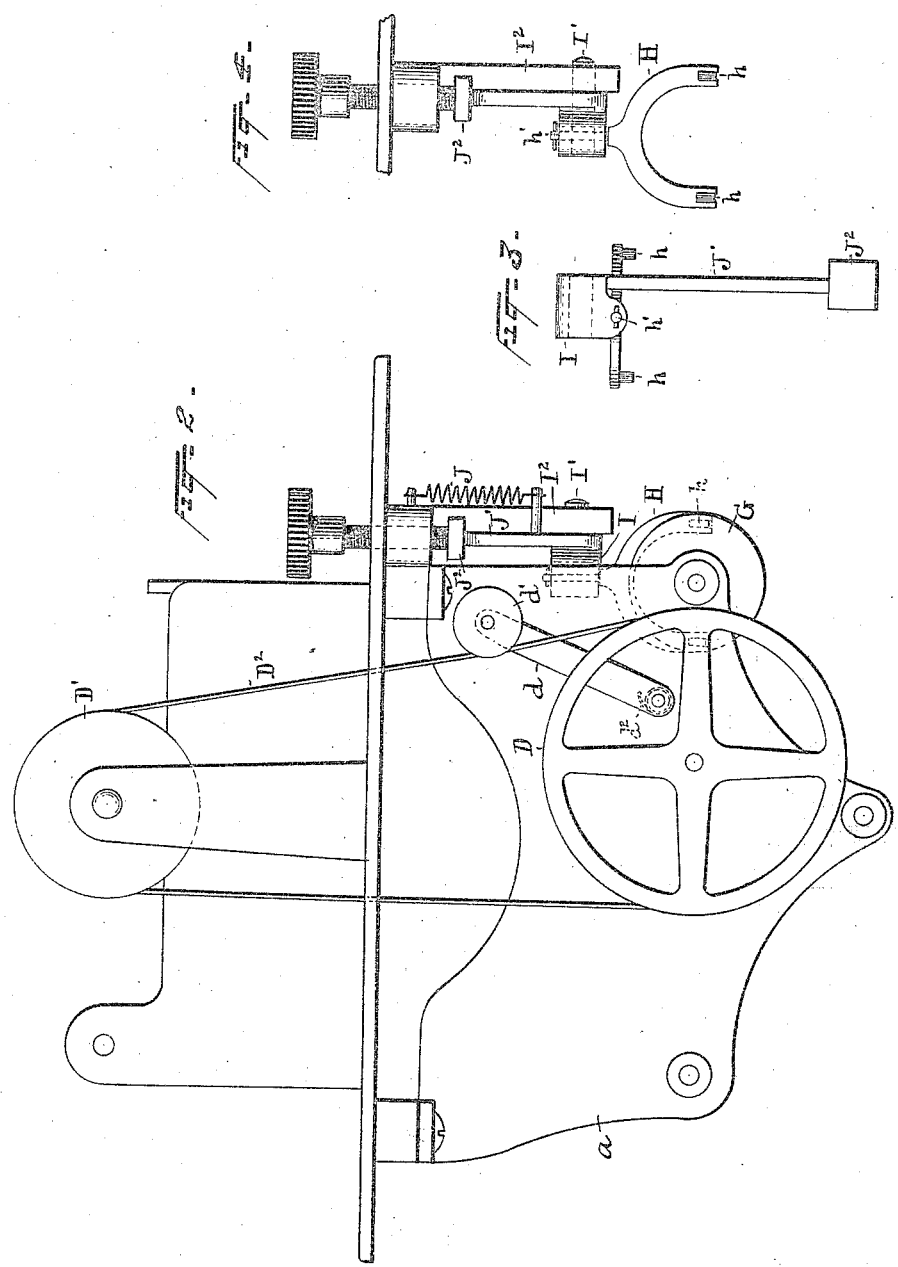

UNITED STATES PATENT OFFICE.

THOMAS A. EDISON, OF LLEWELLYN PARK, NEW JERSEY.

GOVERNOR FOR MOTORS.

SPECIFICATION forming part of Letters Patent No. 604,740, dated May 31, 1898.

Application filed January 27, 1897. Serial No. 620,975. (No model.)

*To all whom it may concern:*

Be it known that I, THOMAS A. EDISON, a citizen of the United States, residing at Llewellyn Park, in the county of Essex and State of New Jersey, have invented a certain new and useful Improvement in Governors for Motors, (Case No. 972,) of which the following is a specification.

My invention relates, mainly, to friction speed-governors provided with means for adjusting the governor for any desired speed and with means, such as centrifugal governor-balls, for regulating the friction members to maintain a constant speed.

The object of my invention is to wholly or largely overcome irregularities in speed due to cramping of the parts, untrue surfaces of friction members, and uneven action of the governor-balls.

In carrying my invention into effect I employ two friction members, one being preferably a rotating disk and the other two or more equidistant blocks or pads held in frictional engagement with said disk, a free and unrestrained equalizing device for producing uniform pressure between the pads and the friction-disk to prevent uneven action due to various causes and to prevent any unequal or cramping strains on the shaft by which the disk is carried, a device for adjusting the friction members to obtain different speeds, and an automatic device, such as a centrifugal governor, for automatically increasing or decreasing the frictional engagement upon an increase or decrease in the speed of the motor to maintain a constant speed.

My invention is illustrated in the accompanying drawings, in which—

Figure 1 is an elevation showing my improved governor applied to a spring-motor and a portion of the feed-screw of a phonograph and the driving connection between the same and the motor. Fig. 2 is an end view looking from the left of Fig. 1, and Figs. 3 and 4 are detail views of one member of the governor.

Referring to the drawings, A is the box containing the driving-spring, which spring is wound up by means of the gearing B and the shaft C, to which a crank is applied. The spring drives the pulley D through the intermediate gearing illustrated, and this pulley is connected with the pulley D' on feed-screw E by the belt $D^2$. Pivoted to the plate $a$ of the frame is an arm $d$, carrying an idler $d'$, which is held against the belt $D^2$ by a spring $d^2$, coiled around the pivot of the arm $d$, and whereby the slack in the belt $D^2$ is taken up.

The speed-governor comprises the centrifugal governor-balls F, carried by springs $f$, which are attached to a hub $f'$ on the spindle $f^3$ and to the sliding sleeve $f^2$, which rotates with the spindle $f^3$ and is capable of longitudinal movement. The sleeve $f^2$ carries a friction-disk G. The spindle $f^3$ is rotated by the pinion $f^4$ meshing with one of the gear-wheels of the motor mechanism. The disk G is in frictional engagement with equidistant friction pads or blocks $h$, which engage the disk at opposite points. These pads are carried by an equalizing device, which in the drawings is illustrated as a yoke H, which is swiveled in a block I by a pin $h'$, (see Figs. 3 and 4,) and the block I is pivoted on a pin I', projecting horizontally from the downwardly-extending arm $I^2$ of the frame. It will readily be seen that the swiveled yoke H is free to adjust itself, so that the pads will both be in contact with the disk at all times, and hence the yoke will equalize the pressure of the pads against the disk G to compensate for an untrue surface and to compensate for unequal wear of the pads and the disk. Thus the cramping of the sleeve $f^2$ on the rod $f^3$ is prevented and irregularities in speed due to such causes avoided. The pressure of the pads upon diametrically opposite points of the disk G also tends to overcome irregularities in speed due to uneven action of the governor-balls. The pads $h$ are held against the friction-disk G by a spring J, connected to the arm J', which is formed integral with the block I. The arm J' is provided with a shoulder $J^2$, with which engages the end of an adjusting-screw $J^3$, working through the top plate of the frame. When the screw $J^3$ is moved upward, so as to bring the full tension of the spring J upon the arm J', the friction at the disk G and the pads $h$ will be such as to hold the motor at rest.

To start the motor, the screw $J^3$ is moved downward, so as to decrease the tension of the spring J, and hence decrease the friction between the disk G and the pads $h$, and when the friction is sufficiently decreased the motor will start, and the degree of friction may be further decreased until the proper speed is obtained. If for any reason the speed of the motor increases beyond the desired speed, the governor-balls F, moving outward, will increase the friction between the disk G and pads $h$, and hence automatically regulate and maintain the desired speed.

To stop the motor, the screw $J^3$ is moved upward until the friction due to the spring J is sufficient to bring the motor to rest.

What I claim is—

1. A friction speed-governor having in combination a rotatable element having a friction-surface, two friction-pads bearing thereon at opposite points, and a swiveled equalizing device for maintaining the same uniform pressure between both pads and said friction-surface, substantially as set forth.

2. A friction speed-governor having in combination a rotatable element having a friction-surface, friction-pads bearing thereon at diametrically opposite points on the same side of the friction-surface, and a swiveled equalizing device for maintaining the same uniform pressure between all the pads and said friction-surface, substantially as set forth.

3. A friction speed-governor having in combination a rotatable element having a friction-surface, friction-pads bearing thereon at opposite points, and an equalizing device for maintaining a uniform pressure between each pad and said friction-surface, said device being supported so as to be capable of swinging about an axis perpendicular to the axis of the friction-surface, substantially as set forth.

4. In a friction speed-governor, the combination of a friction-disk, and a swiveled yoke carrying friction blocks or pads in contact with said disk at diametrically opposite points on the same side of the disk, whereby a uniform pressure between the disk and pads is produced, substantially as set forth.

5. In a friction speed-governor, the combination of a friction-disk, a yoke carrying friction blocks or pads making contact with said disk at diametrically opposite points on the same side of the disk, a pivoted block in which said yoke is swiveled, whereby a uniform pressure between the disk and pads is produced, and means for moving said block on its pivot to vary the friction between said disk and pads to vary the speed, substantially as set forth.

6. In a friction speed-governor, the combination of a friction-disk, a yoke carrying friction blocks or pads making contact with said disk at diametrically opposite points on the same side of the disk, a pivoted block in which said yoke is swiveled, whereby a uniform pressure between the disk and pads is produced, means for moving said block on its pivot to vary the friction between said disk and pads to vary the speed, and a centrifugal governor for maintaining a uniform speed, substantially as set forth.

7. A friction speed-governor having in combination a rotatable element having a friction-surface, two friction-pads bearing thereon at opposite points, and a swiveled equalizing device connecting said pads for maintaining the same uniform pressure between both pads and said friction-surface, substantially as set forth.

This specification signed and witnessed this 25th day of January, 1897.

THOMAS A. EDISON.

Witnesses:
RICHARD N. DYER,
W. PELZER.